May 28, 1935. W. FRIEDRICH 2,003,184

METHOD AND MEANS FOR PRODUCING FOAM FOR FIRE EXTINCTION

Filed Dec. 5, 1933 5 Sheets-Sheet 1

Inventor:
Wilhelm Friedrich,
By Potter, Pierce & Scheffler,
Attorneys.

May 28, 1935. W. FRIEDRICH 2,003,184
METHOD AND MEANS FOR PRODUCING FOAM FOR FIRE EXTINCTION
Filed Dec. 5, 1933 5 Sheets-Sheet 2
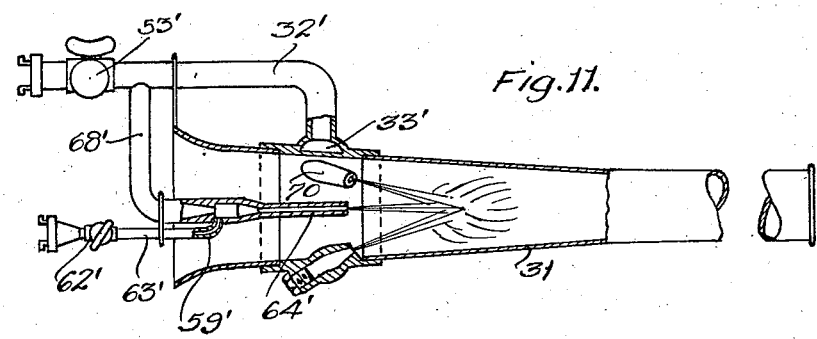
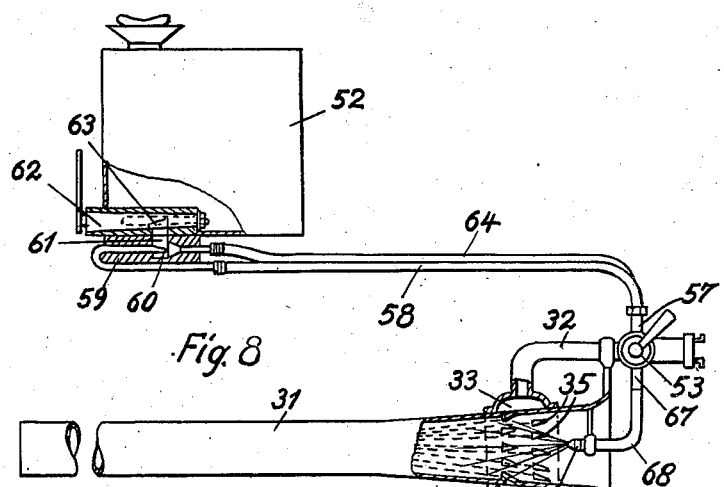
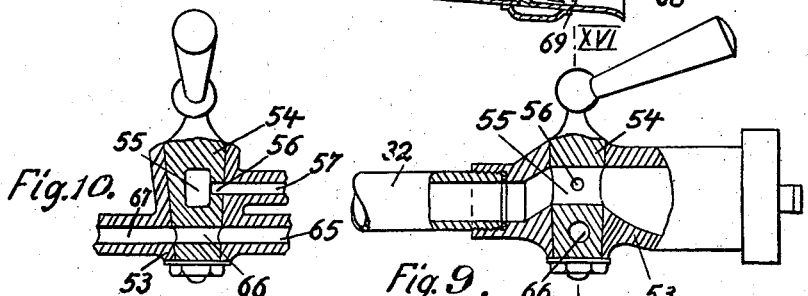
Inventor:
Wilhelm Friedrich,
By Potter, Pierce & Scheffler,
Attorneys.

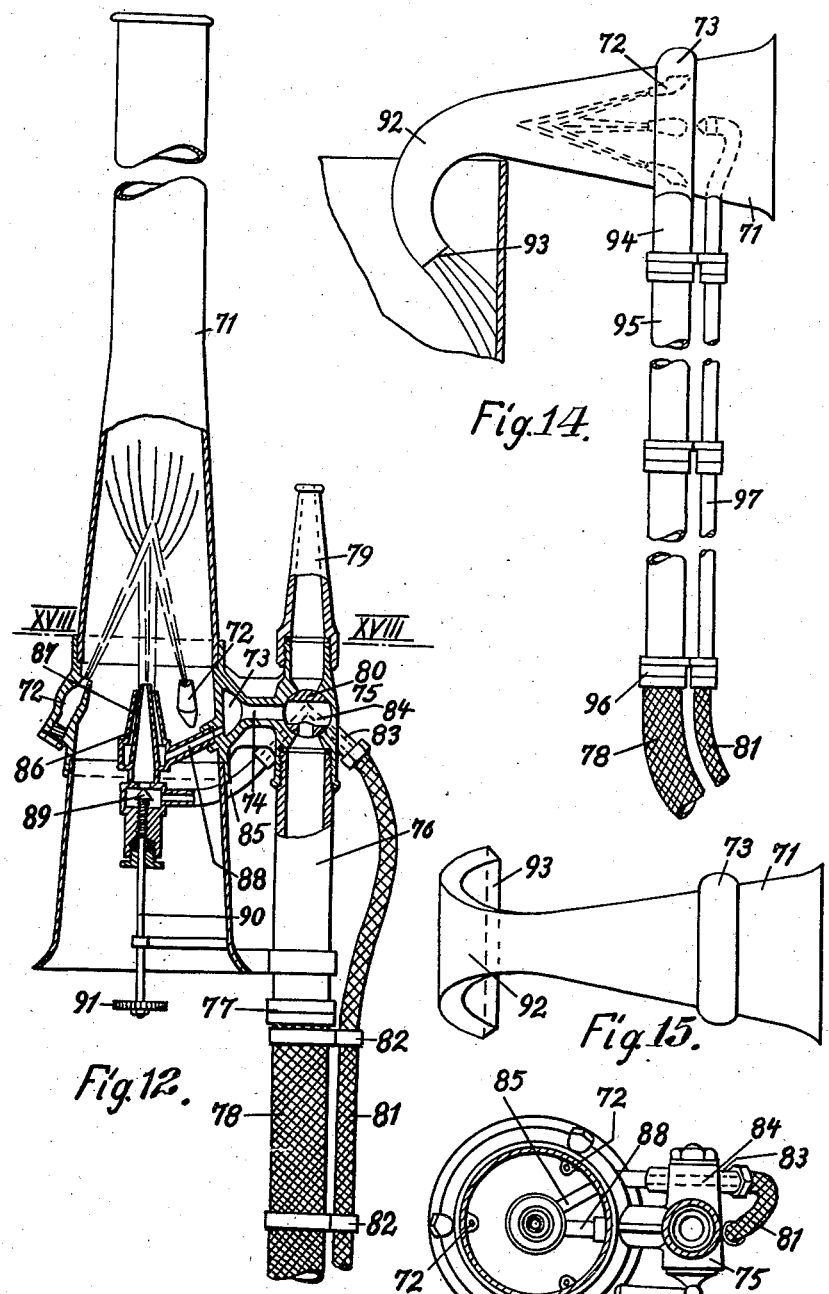

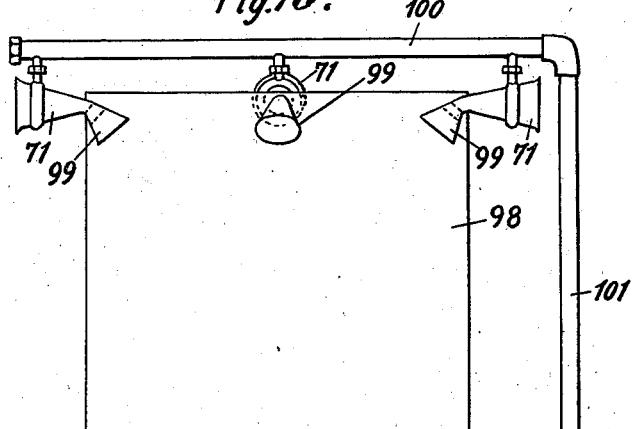

May 28, 1935.  W. FRIEDRICH  2,003,184
METHOD AND MEANS FOR PRODUCING FOAM FOR FIRE EXTINCTION
Filed Dec. 5, 1933   5 Sheets-Sheet 5
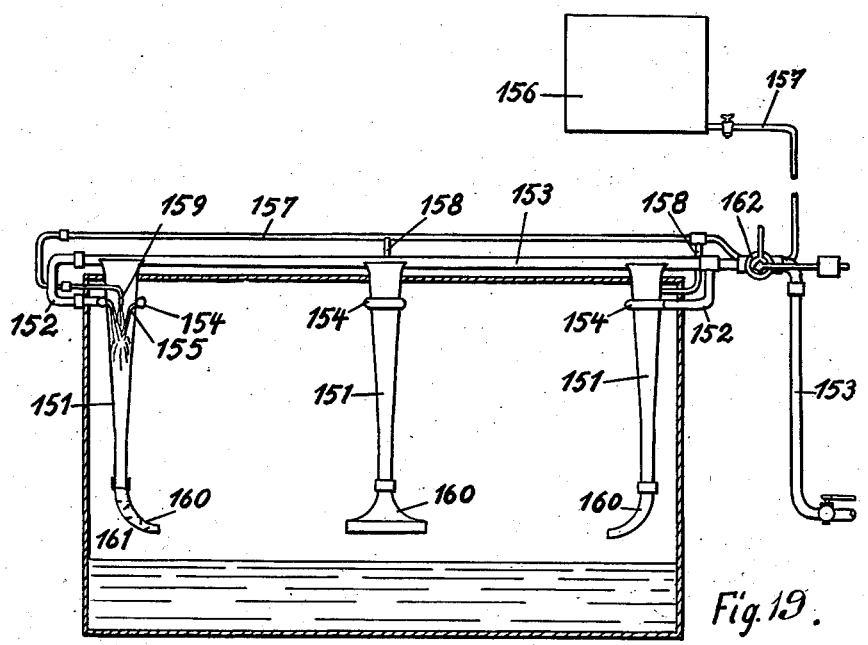
Fig. 19.
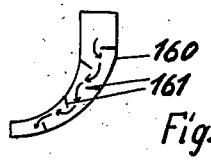
Fig. 20.
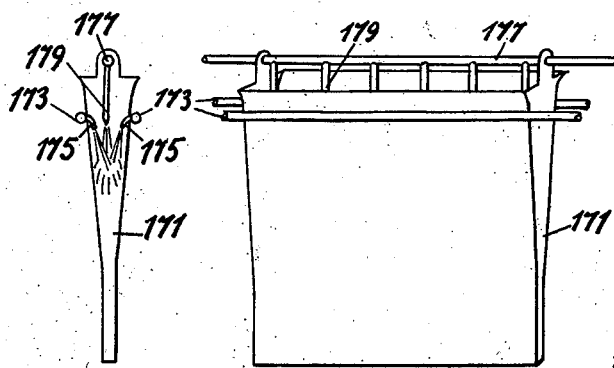
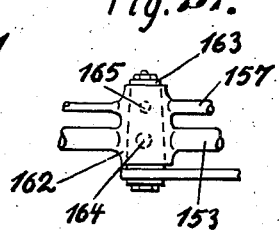
Fig. 21.
Fig. 22.   Fig. 23.
Inventor:
Wilhelm Friedrich,
By Potter, Pierce & Scheffler
Attorneys

UNITED STATES PATENT OFFICE 2,003,184

METHOD AND MEANS FOR PRODUCING FOAM FOR FIRE EXTINCTION

Wilhelm Friedrich, Berlin-Lichterfelde, Germany

Application December 5, 1933, Serial No. 701,069
In Germany December 13, 1932

5 Claims. (Cl. 261—116)

The present invention is a solution of the problem of generating air foam by the use of a fire engine or pump for liquid without the use of gas under pressure.

For this purpose an auxiliary device i. e. a foam generator is interposed on the suction side between the pump and the conduit supplying the water. This foam generator is so constructed that turbulence together with the entry of external air is produced by the water entering under a certain pressure, with which a foam forming agent (i. e. a chemical substance) has been mixed in any suitable way, this turbulence resulting in the production of foam which is directed to the seat of the fire through hose pipes by means of the fire engine pump. To produce turbulence it is necessary for the water to flow in a thin stream under a certain pressure which however need not be very high (about half an atmosphere will suffice). For fine subdivision of the water jet it can be led into the auxiliary apparatus in the form of a plurality of separate impinging jets. The jets are directed longitudinally of the generator but they can also be directed inclined to the longitudinal axis of the apparatus so that they strike one another and produce violent eddying. The subdivision can be carried to the fineness of mist.

It is further necessary for the total cross section of the foam outlet to be many times as great as the cross section of the liquid inlet. As for the production of foam about 8 to 15 volumes of air are required per volume of water and as the water preferably flows at a greater speed than the air entrained thereby, a high ratio of cross-section of the air inlet to the water inlet is necessary.

It has also been found advantageous for the interior of the foam generator in which the foam is produced to be of conical form narrowing in the direction of flow, so that the air entrained by the jets of water gradually increases in speed in the direction of flow until at the actual formation of the foam it has reached the speed of the water.

It has also been found by experiments with the apparatus that for good results in foam formation, the properties of the foam forming agent are not unimportant. By way of example the following foam formers have been found advantageous; sulphonates of fatty alcohols, salts of aromatic alkylated sulpho acids and salts of alkylnaphthalin sulpho-acids.

The above described foam generator is particularly adapted for interposition in the suction pipe of a pressure pump. But in another form it can be used as a nozzle set upon the end of the hose, the water under pressure supplied by the fire engine pump having the foam former added at any suitable place. The foam formation then takes place directly in the nozzle at the place of the fire, air being drawn in by the jet of liquid and worked into foam in the nozzle. It will readily be understood that to increase the turbulence it is desirable to make the nozzle as long as possible since the walls of the nozzle co-operate in the foam formation which is promoted by the turbulence.

When a foam generator in the form of a nozzle is used, it is possible to supply a large number of such nozzles with water from a single fire engine and discharge the resulting air foam.

The foam generator according to the invention is extremely simple and it can be constructed in innumerable ways provided the above prescribed requirements are fulfilled namely the formation of fine jets of liquid or atomization of the liquid, the flow of the jet substantially longitudinally or inclined thereto, the admission of air which is entrained by the turbulence of the liquid, and the production of turbulence by means which are further described below.

As regards the openings for the liquid it has been found that the use of fine, pointed apertures say of star, cross or the like form are advantageous. Such apertures are particularly efficient if the material in which they are formed is not too thick so that the jets of liquid in their passage through the apertures are guided only over the shortest possible length and after such passage can spread.

In place of such star shaped apertures, narrow preferably crescent shaped slots can be used which cause the liquid to emerge in the form of thin films or fan-like jets.

In generators of large size it may be of advantage to use several concentrically arranged generating chambers.

In another embodiment of the foam generator which can be constructed equally well for interposition in a pipe line through which foam is to pass or as a nozzle, instead of a large number of fine jets of liquid, a small number of thicker jets of liquid is used; by causing these jets to strike one another breaking up of the liquid into very fine particles is effected, foam being formed with the air entrained in the direction of the jets, the foam in its course drawing in more air which increases the foam formation.

This mode of foam formation has several advantages. The foam can be generated by a supply of water under pressure in a foam tube which at the same time can be constructed as a nozzle for discharging the foam. Jets inclined towards one another strike together in the foam tube, it not being necessary for the liquid to flow in the form of fine jets as jets of larger diameter can be used. It is only essential that the jets should meet one another at a small angle at a point preferably in the axial direction of the tube, so that at the meeting point the jets break up whereby with a foam former present foam is generated. It is therefore possible to use water containing a considerable proportion of foreign bodies, without its being necessary to employ fine strainers which are liable to be rapidly choked. In practice three nozzles directed towards one another at small angles can be used for the liquid supply, with in some cases a fourth central nozzle which lies axially of the tube and directs a part of the liquid against the vertex of the solid angle formed by the jets from the three inclined nozzles. When such nozzles are used in this manner, then for example for a foam tube which generates around 1 cubic meter of air foam per minute, four nozzles each of say 4 mm. diameter can be used, so that the mesh of the strainer can be 3 mm.

The foam tube is further constructed so that it can be provided at its discharge end with a bend serving as a pouring head while together with the water supply pipe it can be set upon or coupled to a long carrying pipe, so that this foam pouring nozzle can be directed by means of the carrying pipe over the edge of a high tank or vessel in order to supply the tank along its wall with air foam.

A hand foam nozzle can be provided with a multi-way cock and a water nozzle so that by manipulating the cock it is possible to direct water under pressure to the foam nozzle or to the water nozzle, in order to direct either foam or water on to a fire at will.

The invention further extends to the solution of the problem of supplying the foam former to the water under pressure as uniformly as possible and regulatably and of obtaining intimate mixture of the foam former with the water.

The solution of foam former can be mixed with the water under pressure at any desired point in the supply pipe, for example on the suction side of the pump; it can however also be led directly into the foam generator where it mixes with the inflowing water.

To introduce the foam former into the main water current before the pump, that is on the suction side, according to the invention a mixing device is provided by which the foam former solution is drawn in by the pump simultaneously with the water and incorporated in the latter. This device consists of a pipe branch which can be connected to the water pipe, and which is connected to a suitable container holding the foam former through a conduit provided with a closing member.

The introduction of foam former solution into the nozzle and its mixing with the water under pressure therein can according to the invention be effected in various ways; it is essential, firstly that the foam former shall already have been mixed as thoroughly as possible with water and introduced therefore as a solution at a certain not too high concentration. This is important because a highly concentrated foam former solution owing to its high viscosity could not at the great speeds at which the mixing takes place in the generator become sufficiently uniformly and completely distributed through the water under pressure.

Secondly according to the invention care must be taken that when the foam former solution is introduced into the generator constructed as a nozzle it is as finely divided as possible so that it can mix as rapidly and uniformly as possible with the water entering the nozzle in fine jets.

For this purpose in the foam generator according to the invention in addition to apertures for the entry of water under pressure there may be one or more separate apertures for the foam former solution.

To introduce the foam former solution into the jets of water under pressure a spraying nozzle projecting into the foam generator or a plurality of single apertures can be provided which can be constructed in the same manner as the apertures for the water under pressure.

In order to fulfill the first requisite, namely to supply an already thoroughly mixed foam former solution, according to the invention a separate operation is employed which consists in feeding a strongly concentrated foam former solution out of a container by means of water under pressure and a suitable jet apparatus, the solution at the same time being intimately mixed with the water and brought to the required degree of dilution by a regulating device. This operation has the further advantage that the diluted solution enters the foam generator dispersed under a certain pressure.

To carry out this operation according to the invention, for example a part of the water flowing under pressure can be led through a branch pipe to an ejector connected with the container, where the water uniformly draws the foam former solution off and mixed therewith flows into the foam generator.

According to the invention the container for the foam former solution can be in the form of a haversack which the manipulator of the nozzle can carry on his back. Such an arrangement has the advantage that the nozzle manipulator can independently carry out all the necessary operations for regulating the production of foam without reference to the space conditions at the seat of the fire and without the help of assistants. He is also in a position by cutting off the supply of foam former to project water instead of foam.

If the foam nozzle is provided with a multi-way cock for the water under pressure, the cock can also serve for shutting off the foam former. The foam former is advantageously supplied through an interior or exterior nozzle concentric with the water nozzle so that the projecting water jet draws out the foam former by suction while mixing therewith and projects it into the meeting point where the jets are broken up.

Some examples of constructions for carrying out the method of the invention are illustrated in the accompanying drawings.

Figure 8 shows a foam generator in the form of a nozzle in combination with a portable foam former container and devices for feeding and premixing the foam former.

Figure 9 shows a multiple way cock for shutting off the supply of water and foam former, in section on an enlarged scale.

Figure 10 is a section on the line XVI—XVI of Figure 9.

Figure 11 shows a hand foam nozzle partly in axial section, provided with a suction jet pump for supplying foam former.

Figure 12 shows a hand foam nozzle with multi-way cock, partly in axial section.

Figure 13 shows a section on the line XVIII—XVIII of Figure 12 seen from above.

Figure 14 shows a foam tube with pouring head and carrying pipe, in side view.

Figure 15 is a plan view of Figure 14.

Figure 16 shows a series of foam tubes constructed as sprinklers and connected to a single supply pipe, and their arrangement in a chamber.

Figure 17 shows a foam tube constructed as sprinkler partly in section, on an enlarged scale.

Figure 18 shows water pressure pump with an auxiliary device for the admixture of foam former in advance of the pump.

Figure 19 shows another arrangement somewhat similar to Figure 16 for discharging foam into a closed chamber, for example an oil tank.

Figure 20 is a detail of the foam discharging bends used in Figure 19,

Figure 21 is a detail of the control cock,

Figure 22 is a cross section of a further modified foam generator, and

Figure 23 is a perspective view of Figure 22.

Figure 1:
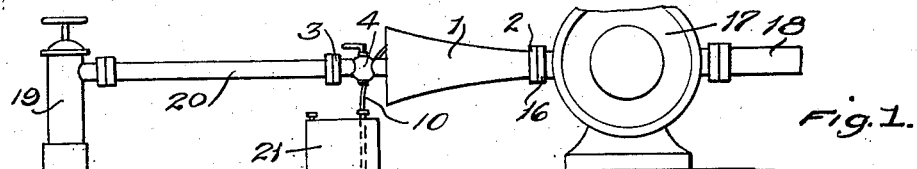
Figure 1 shows an elevation of the complete foam generator interposed between a hydrant and a pump.

Figure 1 shows the generator 1 in combination with a pump 17 which further works up the entering foam and forces it through the hose 18 from which the foam can be directed upon a fire through an ordinary plain nozzle. The water is in this case supplied from a hydrant 19 and led to the generator through a hose 20. The foam former solution is fed from a container 21 by a suitable suction or pressure device not shown.

Figure 2:
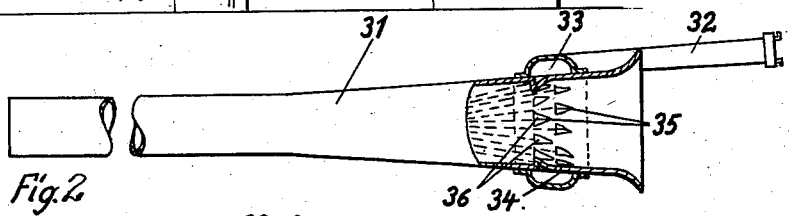
Figure 2 shows a foam generator in the form of a nozzle, partly in section.
Figure 3:
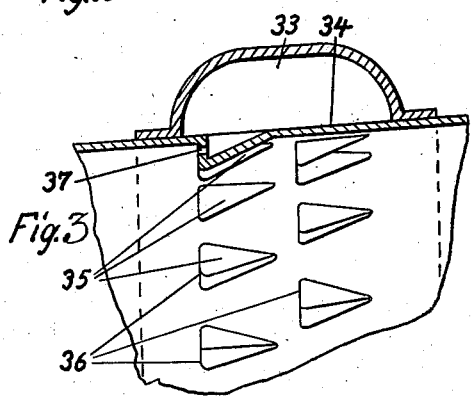
Figure 3 shows a detail of the generator of Figure 2 in section on an enlarged scale.
Figure 4:
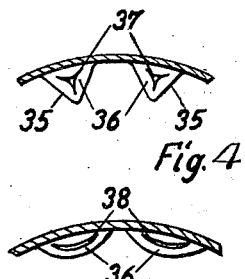
Figures 4 and 5 show different forms of water inlet into the generator, on an enlarged scale in plan.
Figure 5:
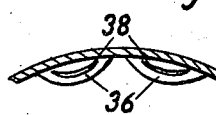

The generator shown in Figure 2 consists of a long tube 31 open at both ends and preferably expanding conically towards the inlet end, on which a connection 32 for water under pressure is arranged. This connection 32 communicates with an annular conduit 33 surrounding the tube 31 near the inlet end, the inner wall 34 of the conduit having one or more—two are shown in the example—rows of inwardly pressed hollow projections 35 with end walls 36. In the end wall 36 of each projection 35 is an aperture for the discharge of water under pressure, as can be seen from Figures 3 to 5. In Figures 3 and 4 these apertures 37 are star shaped, while in Figure 5 the apertures 38 are of narrow crescent shape.

In the tube shown in Figure 2 the water supplied under pressure through the hose and the connection 32 enters the annular conduit 33 and from thence is projected through the apertures 37 and 38 in spreading jets inclined with respect to the axis of the tube into the interior thereof, where under the action of the turbulence of the jets upon the air drawn in, foam is formed.

Figure 6:
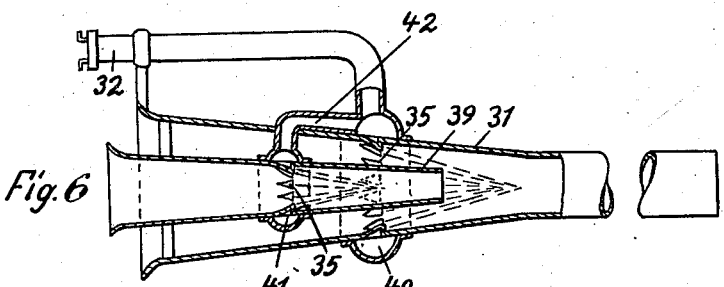
Figure 6 shows in section a foam generator in the form of a nozzle with two concentrically arranged generating chambers.

Figure 6 shows another form of the foam generator according to the invention, in which two generating chambers are concentrically arranged one around the other. Such an arrangement is desirable for foam projecting nozzles of large output. A small conical flared tube 39 is concentrically arranged within the outer tubes 31. Both the outer and inner tubes have rows of hollow projections 35 which are provided in their ends with apertures for the projection of the water under pressure. The rows of projections communicate with annular conduits 40, 41. The annular conduit 41 of the inner smaller tube 39 communicates through a conduit 42 with the annular conduit 40 to which the water under pressure is supplied through the connection 32. The sucking in of the air and the formation of foam take place in two independent chambers; the foam formed in the two chambers unites during its passage through the forward part of the tube 31.

Figure 7:
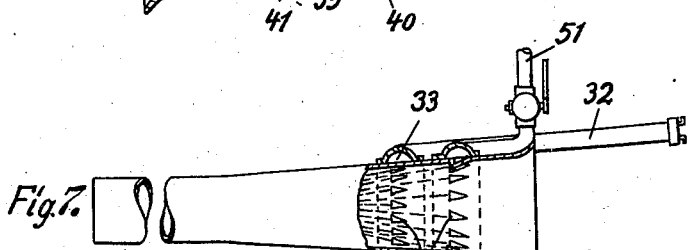
Figure 7 shows partly in section a generator with separate water and foam former supplies.

If the admixture of the foam former is to take place only in the foam nozzle itself, the foam former can be mixed with the water jets projected into the nozzle in various ways. One embodiment of such foam generating nozzle is shown in Figure 7. Here two rows of apertured hollow projections 35 are provided on the inside of the nozzle wall, of which one row is supplied with water under pressure through the pipe 32 and conduit 33, while the other row is connected by a conduit 50 with a supply pipe 51, preferably closable, through which the foam former is supplied. The foam former projected through the latter row of projections flows in the general direction of the water jet, and the air sucked in, mixes therewith and effects the formation of foam.

Another way of supplying the foam former in the nozzle is shown in Figure 8, in which a device is shown in which the foam former is drawn off by a by-passed portion of the water under pressure and gradually mixed with and diluted by such water, the dilute foam former solution then being led in finely divided form into the jets of water under pressure. Here the foam former container 52 can be carried on the back and is connected with the nozzle 31 by two hose pipes.

In the supply pipe for the water under pressure is a multi-way cock 53 (see Figures 8, 9 and 10) which with the plug 54 in open position allows the main current of water to pass through the main plug passage 55 to the annular conduit 33 from whence the water is projected in jets through the apertures in the projections 35 in the manner above described. A part of the water can flow into the hose pipe 58 through a lateral bore 56 in the plug 54 communicating with the main passage 55. This hose 58 leads to an ejector device 59, of which the jet nozzle 60 projects into the chamber 61.

This chamber is regulatably connected with the interior of the foam former container 52 through a cock 62. The water projected through the nozzle 60 draws foam former from the container 52 through the outlet 63 from the cock 62, and the foam former is entrained by the water jet, becoming intimately mixed therewith. The outlet from the ejector 59 is connected to a second entry 65 to the cock 53 by a second hose 64. As Figures 9 and 10 show, with the cock 53 in working position, the liquid coming from the ejector 59 flows through the hose 64, to the entry 65 and through a passage 66 to an outlet 67 on the other side. From here the dilute foam former solution through a bent tube 68 reaches an atomizing nozzle 69 (Figure 8) through which the solution is projected in finely divided form between the jets of water under pressure emerging from the two rows of projections into the interior of the nozzle 31. By this mode of supply very rapid and intimate intermixing of the foam former, already diluted, with the jets of water is effected so that a considerable output of foam is obtainable with small consumption of foam former.

The supply pipe 32 can at the same time serve as a handle for the foam generating nozzle. Advantageously the pipe 32 can run along the near end of the nozzle at a certain distance from it, as Figures 6 and 8 show so that the fingers can be accommodated in the space between.

The suction jet pump for feeding and premixing the foam former can however be located in the foam generating nozzle itself. Such an embodiment is illustrated by way of example in Figure 11. In the long nozzle tube 31, the rear entry end of which is flared outwardly, three nozzles 70 are set in a ring, to which water under pressure is supplied through an annular conduit 33'. The conduit 33' communicates with a pipe connection 32' serving at the same time as a handle.

From the connection 32' a branch 68' leads from a point behind the control cock 53', which carries a part of the water under pressure to the suction jet pump 59' of which the suction chamber communicates with the foam former supply pipe 63'. The discharge pipe 64' of the jet pump 59' is arranged longitudinally in the centre of the pipe 31 and projects the water-foam former mixture against the meeting point of the inclined jets projected from the nozzles 70.

This arrangement has the advantage over that illustrated in Figures 8–10 that by using a suction hose the foam former can be drawn out of any desired container and raised to a certain height.

To regulate the supply of foam former a control cock 62' is provided in the pipe 63'.

The foam generating nozzle shown in Figures 12 and 13 has three nozzles 72 for water under pressure arranged in a ring round a nozzle tube 71, which communicates with an annular conduit 73, and has a fourth centrally arranged nozzle 86 which communicates with the conduit 73 by a pipe 88.

The water under pressure is supplied to the annular conduit 73 through a pipe 76 serving as a handle and fitted with a multi-way cock 75, to which the water hose 78 is connected by a coupling 77. On the opposite side of the cock to the pipe 76, a screwed on water nozzle 79 is provided.

The plug 80 of the multi-way cock is provided with ducts so arranged that the water under pressure in the pipe 76 can be shut off, or allowed to flow through the connection 74 to the foam nozzle or to the water nozzle 79.

The foam former is supplied through a separate hose 81 which can be attached to the water hose 78 by clips 82 or other suitable means. Connection to the multi-way cock is made by a separate coupling 83 from whence the foam former flows through a separate duct 84 in the plug into a pipe 85 leading to a central nozzle 86 concentrically arranged within the central water nozzle 87. The water under pressure is led to this nozzle 87 from the annular conduit 73 by a pipe 88. To regulate the outflow of foam former a cone valve 89 is provided, the spindle 90 of which can be turned by a hand wheel 91 outside the tube 71 in order to regulate the flow to the nozzle 86.

The foam former is supplied through the hose 81 at a certain positive pressure which need not be very high.

In the example shown in Figures 14 and 15 the foam projecting end of the open ended foam tube 71 is in the form of a bend 92 having a wide outlet 93. Nozzles 72 communicating with the annular conduit 73 are provided in the tube for the water under pressure; the conduit 73 is carried upon a connection 94 which can be attached to a carrying pipe 95 by means of a coupling, by screwing or in any other suitable manner. The connection 94 is at an angle, say at a right angle, to the axis of foam tube 71. The carrying pipe 95 can be connected at its lower end by a coupling 96 with the water hose 78. The carrying pipe 95 itself can be in a single piece, or it can consist of a plurality of pieces assembled for example by couplings or screwing, or it can be made telescopic, in order to adapt it to the height to be reached by the foam tube 71.

The necessary foam former can be added to the water under pressure at any desired point. It can however be supplied through a separate hose 81 and pipe 97 to a separate nozzle, provided in the foam tube with the pouring head, in a similar manner to that in Figures 12 and 13.

Instead of with a pouring head, the foam tube can be provided with a sprinkler head which effects distribution of the foam over a larger surface. Such a construction is illustrated in Figures 16 and 17. In the upper part of the space 98 to be supplied with foam a number of foam nozzles 71 with sprinkler heads 99 are distributed, the whole of the foam tubes being connected to a single supply pipe 100. In Figure 17 a sprinkler is shown for example in which the distributing device consists of inclined guide vanes 99'. The water under pressure is supplied through the pipes 102, 101. To admix the foam former, a water jet suction pump is here provided. This lies at the end of a pipe 103 branched out of the pipe 102, and terminating in an ejector nozzle 104, while a pipe 106 coming from a container 107 holding the foam former terminates in the suction chamber 105 around the nozzle 104. To produce the pressure for driving the foam former up the rising pipe 108, any suitable pressure generating device can be used, for example a hand air pump; instead a bottle 109 of compressed gas with a pressure reducing valve 110 can be used.

A part of the water branched off through the pipe 103 is led to the jet pump 104, 105 wherein the foam former arriving under pressure, is carried mixed with water through the pipe 101 to the distributing pipe 100. Advantageously a control member 111 is provided in the pipe 102 behind the branch 103, by which the section of the pipe 102 can be reduced to ensure sufficient flow of water through pipe 103 and the pump 104, 105. A second control member 112 can be provided in pipe 102 in advance of the branch pipe 103.

If a pump, for example a fire engine pump, is used for supplying water under pressure, the foam former can be led into the pump itself. Such an arrangement is shown by way of example in Figure 18. Here again a jet pump 113 is provided for feeding in the foam former. The necessary water under pressure for actuating the jet pump is advantageously drawn from the pressure side that is from the outlet 114 of the pump 115 and led through a separate pipe 117 with control member 116, to the jet pump 113 to which the foam former flows, regulated by a member 119, from a container 118. The foam former mixed with water in the jet pump is then led to the inlet 120 of the pump 115.

In Figure 19 there are a plurality of foam generators 151 for example three, connected to a common water supply pipe 153 by bends 152. Each generator has near the upper funnel shaped inlet end an annular conduit 154 connected with the bend 152, supplying a number of nozzles 155 inclined towards the axis of the generator from which jets of water emerge as can be seen from the left hand generator which is shown in section. The jets of water under pressure meet at a point further on in the generator setting up considerable turbulence which with the entrained air produces foam as described earlier herein. If foam former is not already mixed with the water under pressure, a solution of foam former can be supplied through a separate pipe. In the present example a container 156 for foam former is located at a higher level, from which foam former solution is supplied to the separate generators 151 by a pipe 157 and branches 158. To admix the foam former, each generator 151 is provided with an axial nozzle 159 from which a jet of foam former is directed against the meeting point of the jets of water. To distribute the foam flowing out of the generators suitable devices, for example bends 160, sprinkler heads or the like can be provided at their lower ends. Bends having inclined guide surfaces 161 which retard the foam and by increasing the turbulence render the bubbles finer, have been found particularly advantageous. Such a bend is illustrated in section on a larger scale in Figure 20. The foam is compelled by the guide surfaces 161 to take a zig-zag path by which a considerable increase in fineness is attained.

The water supply pipe 153 and the foam former supply pipe 157 can be provided with a common control cock 162 having one duct for the water and another for the foam former solution. Such a cock is indicated in Figure 21 on an enlarged scale. The plug 163 of the cock 162 has one duct 164 for the water under pressure and a separate duct 165 for the foam former solution. In normal position both the pipes 153 and 157 are closed; by turning the plug through 90° the cock is opened. The plug 163 could be connected to any suitable automatic device of well known kind which would open the cock upon the outbreak of fire and thus set the apparatus in action.

In Figures 22 and 23 a foam generator is shown which consists of a downwardly tapering chamber 171 of flat elongated section, having at its upper end a series of water nozzles 175 connected to common water supply pipes 173. The nozzles are arranged opposite one another in pairs so that the emerging jets of water strike at an acute angle. In this example the foam former solution is supplied through vertical nozzles 179 which are connected to a common supply pipe 177. The nozzles 179 are so arranged that the emerging jets are directed against the meeting points of the water jets projected by the nozzles 175, where the foam former mixes with the water and foam is generated with the entrained air.

In this case also, the pipe 177 can be fed by gravity from an elevated container. Obviously this example can be provided with a cock controlling both foam former and water and combined with an automatic release device which upon the outbreak of a fire sets the apparatus in action.

What I claim is:—

1. Method of producing a fire extinguishing foam which comprises dividing a unitary stream of quenching liquid into a plurality of relatively small free flowing converging jets whereby said stream is transformed into a stream of the liquid in finely divided form and aspirating air into and by means of said finely divided stream in the presence of a foam promoting agent.

2. Method of producing a fire extinguishing foam as defined in claim 1 in which the foam promoting agent is supplied in the form of a jet uniting with the converging jets of the quenching liquid at their meeting point.

3. Apparatus for the production of fire extinguishing foam comprising a tube having entrance and discharge ends, a conduit for quenching liquid, means adjacent the entrance end of the tube for finely subdividing the quenching liquid and projecting the stream of the resulting finely divided liquid through said tube toward the discharge end thereof, and means for mixing a foam promoting liquid agent with said quenching liquid comprising a nozzle, a conduit for foam promoting agent communicating with the outlet of said nozzle and a branch conduit connecting said conduit for quenching liquid to said nozzle.

4. Apparatus as defined in claim 3 in which the nozzle is an aspirating nozzle positioned to discharge into the entrance end of the tube.

5. Apparatus for the production of fire extinguishing foam comprising a tube having an entrance end and an open discharge end, a conduit for quenching liquid, a plurality of nozzles located adjacent the entrance end of the tube and positioned to deliver converging jets of liquid and communicating with said conduit, for finely subdividing the quenching liquid delivered by said conduit and projecting the resulting stream of finely subdivided quenching liquid through the tube toward the discharge end thereof, means for mixing a foam promoting agent with the quenching liquid comprising a conduit for foam promoting agent, at least one nozzle located adjacent the entrance end of the tube and adapted to project a stream of the liquid delivered by said last named conduit through and toward the discharge end of said tube, and inlet means adjacent the entrance end of said tube opening to the atmosphere.

WILHELM FRIEDRICH.